UNITED STATES PATENT OFFICE.

OSCAR BUSH, OF GRAND FORKS, NORTH DAKOTA, ASSIGNOR OF ONE-HALF TO EDWARD P. ILTEN, OF GRAND FORKS, NORTH DAKOTA.

CALCIMINING COMPOUND.

993,752.     Specification of Letters Patent.     Patented May 30, 1911.

No Drawing.     Application filed September 29, 1910. Serial No. 584,555.

*To all whom it may concern:*

Be it known that I, OSCAR BUSH, a citizen of the United States, residing at Grand Forks, in the county of Grand Forks and State of North Dakota, have invented a new and useful Calcimining Compound, of which the following is a specification.

This invention has reference to improvements in compositions to be used in connection with calcimine or other like wall coatings, and its object is to provide a composition which may be mixed with the calcimine or other coating to be applied to the wall, so that the suction of the wall is destroyed and the wall coating may be applied without previously sizing the wall and without danger of such streaking or spotting as occurs when calcimine is applied to unsized walls.

The invention is particularly adapted for use with the wall coating commonly known as calcimine, and the ordinary calcimine of commerce may be taken as an example of a wall coating having characteristics calling for the addition of the material hereinafter described without, however, limiting the invention to any specific calcimine or other like wall coating, since the word calcimine as herein used is not to be limited to any particular composition which might be included under the term calcimine as this word is used in the description and claim.

Ordinarily the calcimine of commerce is made up of fifteen or twenty parts of Paris white and about one part of glue, the mixture being made to a consistency about that of cream by a suitable quantity of water.

The present invention is well adapted for use in connection with such a calcimine compound, but other like mixtures may be employed.

The present invention comprises an extract of flaxseed made by subjecting flaxseed to the action of boiling water for a suitable time, and the extract so obtained is mixed with the calcimine in suitable proportions depending upon the character of the surface to be covered.

The extract of flaxseed may be obtained by placing the flaxseed in water in the proportions of one pound of flaxseed to one gallon of water, boiling the mixture for, say, four hours, exactitude of proportions and time of boiling not being mandatory. The resultant compound is allowed to stand until the flaxseed settles, when the extract is poured off and filtered and may then be put in containers of any suitable size ranging from small cans to barrels. Since the extract is liable to spoil when exposed to the atmosphere, some suitable preservative may be employed, benzoate of soda answering the purpose, and may be used in the proportions of about four ounces of benzoate of soda to one gallon of the extract.

The extract is more or less mucilaginous, and may be made of flaxseed meal, this being the residue after the linseed oil has been expressed from the ground flaxseed, but usually flaxseed itself is to be preferred, since the finely ground flaxseed meal does not settle as readily as the flaxseed after the extract has been made.

No definite proportions can be given for the quantity of flaxseed extract to be mixed with the calcimine, since this will depend largely upon the condition of the wall to be covered. If the wall has little suction the quantity of flaxseed extract to be mixed with the calcimine may be comparatively small, but if the suction of the wall be considerable a proportionately larger amount of the flaxseed extract must be used. The mixing of the flaxseed extract with the calcimine may be done when the operator is ready to apply the calcimine to the wall.

Ordinarily the suction of a wall is destroyed by applying thereto a sizing, usually a glue sizing, before the calcimine is laid on, for without such sizing the suction of the wall will cause the absorption of the water of the calcimine and the latter will, when dry, be streaky or spotted, requiring numerous coats to obtain a smooth and satisfactory result.

By the present invention the preliminary sizing of the wall is entirely obviated, the suction destroying means being carried by the calcimine itself. The extract being of a mucilaginous nature, the calcimine hangs well to the brush and slips easily, but does not splash like calcimine unmixed with the extract, no brush marks are visible, nor will the calcimine when applied show streaks or laps, the quality and finish are improved, the covering capacity is increased, and the calcimine with the extract mixed therewith is cheaper, since time is saved in the application of the calcimine, because a single coat without preliminary sizing is sufficient for the production of a satisfactory job.

For convenience of shipping or storage, the soluble elements of flaxseed may after extraction be reduced to a dry state to be again dissolved when desired for use, for by the addition of an appropriate quantity of water the preparation may be employed in the same manner as when first prepared.

What is claimed is:—

A wall coating comprising calcimine and the soluble elements of flaxseed mixed therewith.

In testimony, that I claim the foregoing as my own, I have hereto affixed my signature in the presence of two witnesses.

OSCAR BUSH.

Witnesses:
W. J. MAYER,
THERESA MAYER.

Copies of this patent may be obtained for five cents each, by addressing the "Commissioner of Patents, Washington, D. C."